United States Patent [19]

Kitamura

[11] Patent Number: 5,098,281

[45] Date of Patent: Mar. 24, 1992

[54] INJECTION MOLD CAPABLE OF SHEARING FILM GATE WITHIN MOLD

[75] Inventor: Takehiko Kitamura, Chiba, Japan

[73] Assignee: Sumitomo Heavy Industries, Ltd., Tokyo, Japan

[21] Appl. No.: 606,280

[22] Filed: Oct. 31, 1990

[30] Foreign Application Priority Data

Nov. 1, 1989 [JP] Japan .................. 1-283042

[51] Int. Cl.⁵ .................................. B29C 45/38
[52] U.S. Cl. .................... 425/553; 264/154; 264/334; 425/554; 425/556; 425/808
[58] Field of Search ............ 425/553, 554, 556, 577, 425/808; 264/154, 161, 328.9, 334, 106, 107

[56] References Cited

U.S. PATENT DOCUMENTS 4,404,160  9/1983  Bonissone et al. .......... 264/328.9
4,738,613  4/1988  Eichlseder et al. .......... 425/556
4,822,270  4/1989  Bonissone et al. .......... 425/556

Primary Examiner—Timothy Heitbrink
Attorney, Agent, or Firm—Armstrong, Nikaido, Marmelstein, Kubovcik & Murray

[57] ABSTRACT

An injection mold of the type in which a film gate of a resin is formed and in which shearing of the film gate is conducted by a movement of a gate cutter alone. The gate cutter has a stepped cylindrical form with a main cylindrical portion of a greater diameter and a coaxial end cylindrical portion of a smaller diameter. When the mold is closed, the end cylindrical portion being received in the bore of a confronting die leaving therebetween an annular gap of a radial size which determines a gate thickness. The outer peripheral surface of the portion of the gate cutter received in the bore of the die presenting a gate land.

1 Claim, 3 Drawing Sheets

INJECTION MOLD CAPABLE OF SHEARING FILM GATE WITHIN MOLD

BACKGROUND OF THE INVENTION

1. Field of the Invention

The present invention relates to an injection mold having a mechanism for shearing a film gate within the die. More particularly, the present invention is concerned with a configuration of the gate which is capable of optimizing the flow rate and the pressure of the resin supplied into the cavity.

2. Description of the Related Art

A die for molding an optical disk will be described as an example of a die having a mechanism for shearing a film gate within an injection mold.

Referring to FIG. 2, a known injection mold has a gate which is defined by the end surface a of a gate cutter 1 and the end surface b of a sprue bush 2. In this mold the gap between the end surfaces a and b and the length l of the lands presented by the above-mentioned end surfaces are determined to stabilize the flow of the flowing resin and optimize the application of pressure.

The cutting of the gate is effected by a forward movement of the gate cutter 1 as indicated by an arrow in FIG. 3, while allowing the sprue bush 2 to be retracted. This in turn requires that the touch pressure of the nozzle 3 of the injection molding apparatus is reduced or the nozzle 3 is forcibly retracted. Anyway, a delicate and intricate control is necessary.

If the shearing has to be conducted by the forward movement of the cutter 1 alone, it is necessary that the sprue bush 2 is set at the retracted position as shown in FIG. 4. In this case, the gate is defined by the clearance between the inner peripheral corner c of the dies 4 and the outer peripheral end d of the gate cutter 1. Namely, the land l shown in FIG. 2 is substantially zero so that the effect for stabilizing the flow of the resin and the application of the pressure to the cavity 5 depends solely on the thickness of the gate.

With this type of injection mold, therefore, it has been extremely difficult to produce a product having an essential characteristic which is worsened in accordance with a rise in the molding pressure, e.g., birefringence in case of an optical disk, since the production of such product requires a highly delicate control of the molding pressure.

SUMMARY OF THE INVENTION

Accordingly, an object of the present invention is to provide an injection mold of the type in which shearing of gate is effected by a forward movement of the gate cutter alone, wherein the configuration of the gate is improved to enable the flow rate and the pressure of the resin supplied to the cavity to be easily controlled with a simple construction.

To this end, according to the present invention, there is provided an injection mold in which a film gate of a resin is formed and in which shearing of the film gate is conducted by movement of a gate cutter alone, wherein the improvement comprises that the gate cutter has a stepped cylindrical form with a main cylindrical portion of a greater diameter and a coaxial end cylindrical portion of a smaller diameter, the end cylindrical portion, when the mold is closed, being received in a bore of a confronting die leaving therebetween an annular gap of a radial size which determines a gate thickness, the outer peripheral surface of the portion of the gate cutter received in the bore of the die presenting a gate land.

The above and other objects, features and advantages of the present invention will become clear from the following description of a preferred embodiment when the same is read in conjunction with the accompanying drawings.

DESCRIPTION OF THE PREFERRED EMBODIMENT

A preferred embodiment of the present invention will be described with reference to FIG. 1. The injection mold of the present invention, which is of the type in which the shearing of the gate is effected by a movement of the gate cutter 1 alone, is characterized in that a gate land is formed on the gate cutter 1 so as to stabilize the flow of the resin into the cavity while optimizing the pressure applied to the resin in the cavity.

Figure 1:
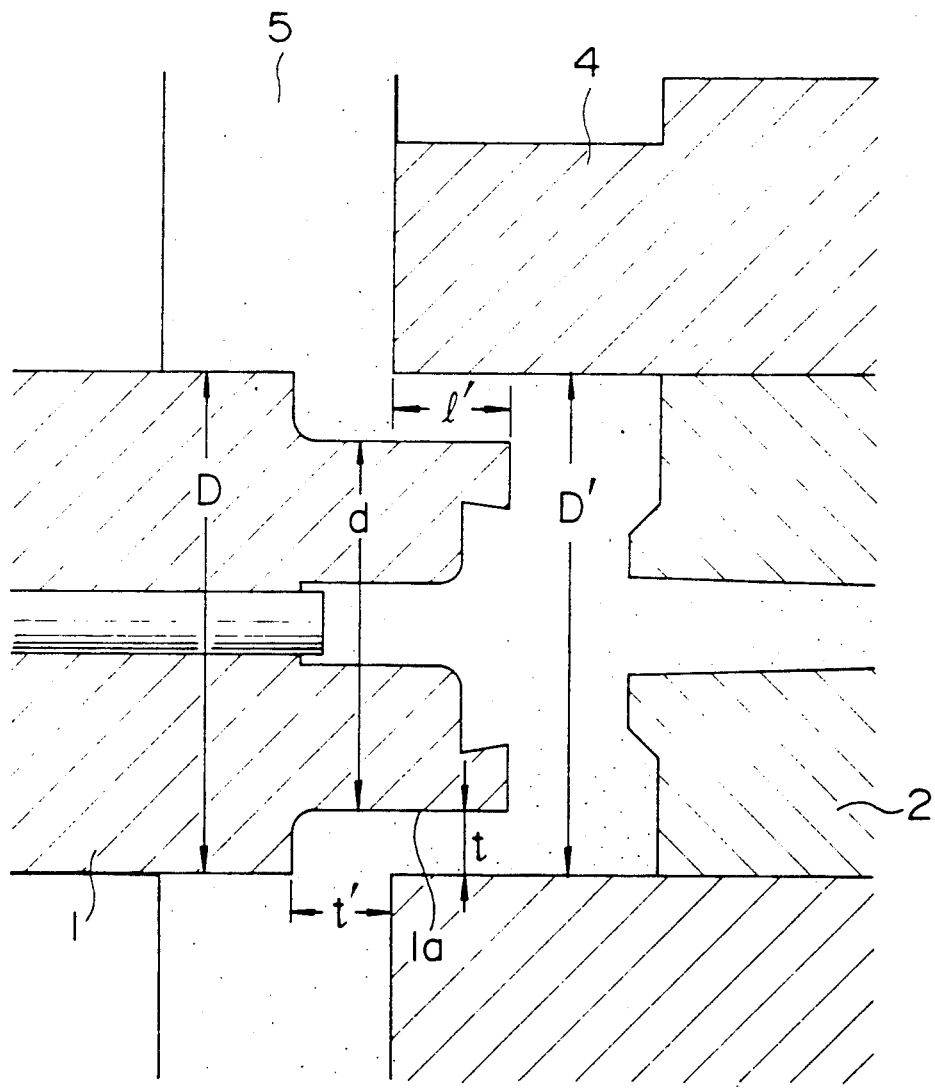
FIG. 1 is a sectional view of an injection mold in accordance with the present invention.
Figure 2:
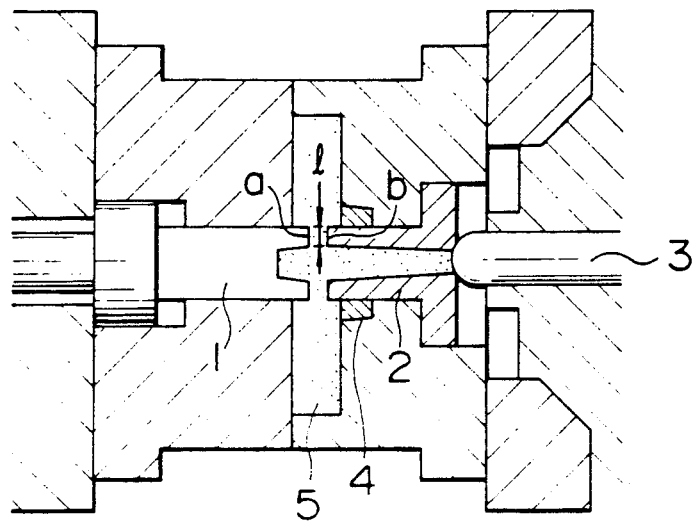
FIG. 2 is a sectional view of a known injection mold in a state before the shearing of gate.
Figure 3:
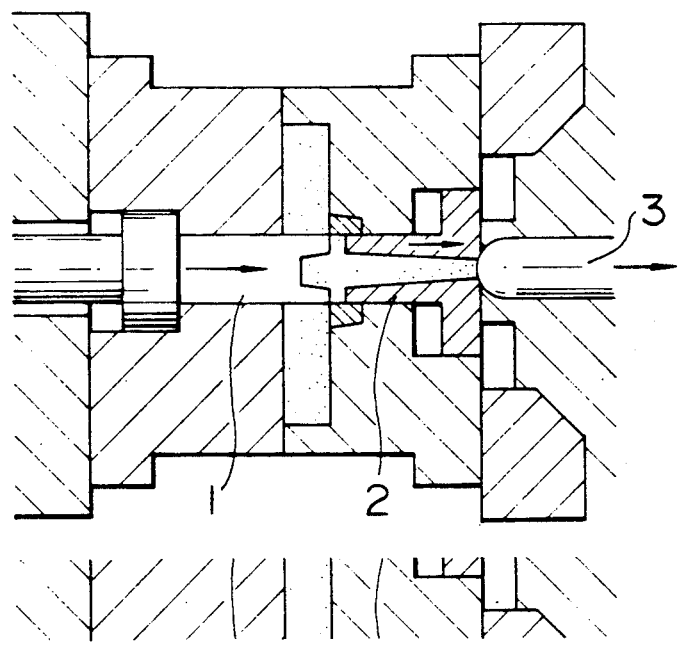
FIG. 3 is a sectional view of the injection mold of FIG. 2 in a state after the shearing of the gate.

Referring to FIG. 1, the injection mold has a gate cutter 1 and a die 4. The end of the gate cutter 1 adjacent the die 4 is stepped so as to provide a small-diameter end portion which is coaxial with the main portion of the gate cutter 1 and which has a diameter "d" smaller than the diameter D of the main portion. The arrangement is such that, when the injection mold is closed for injection, the small-diameter end portion of the gate cutter 1 is received in the bore of the die 4 leaving an annular gap t therebetween. The bore of the die 4 has an inside diameter D' corresponding to the outside diameter D of the main portion of the gate cutter 1 so that, when the gate is cut, the main portion of the gate cutter fits in the bore of the die 4.

With this arrangement, it is possible to preserve the gate thickness t or t' and the gate length l', thus making it possible to stabilize the flow of the resin flowing into the cavity 5 and to optimize the transmission of pressure to the resin in the cavity 5.

Figure 4:
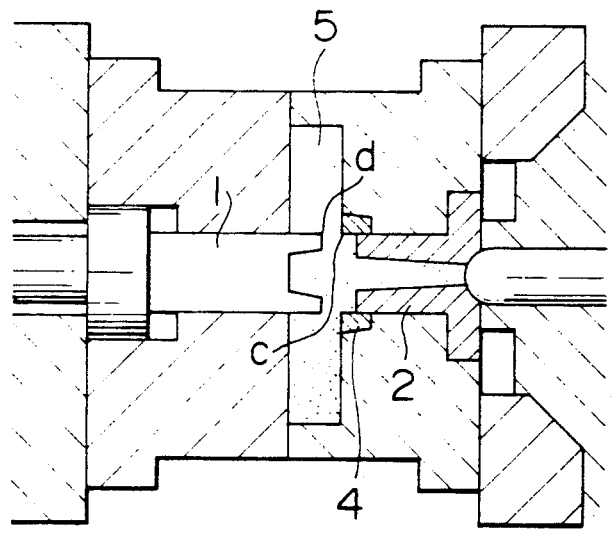
FIG. 4 is a sectional view of a modification of the known injection mold of FIG. 2 in which shearing is effected by a movement of the gate cutter alone.

Although the sprue bush 2 and the die 4 are illustrated as independent members in FIG. 4, it is to be understood that these members may be constructed integrally with each other.

The invention is generally applicable to various molds of the type having a film gate in which gate cutting operation is conducted while the material is still in the die and in which the quality of the product is largely affected by the pressure of the resin and the state of the resin flowing into the die cavity, although an injection mold for optical disks has been specifically described.

As has been described, according to the present invention, it is possible to optimize the state of flow of the resin and the pressure of the resin in the die cavity by virtue of the gate thickness and the gate land length which are presented by the claimed structure of the mold.

Although the invention has been described through its specific terms, it is to be understood that the described embodiments are only illustrative and various changes and modifications may be imparted thereto without departing from the scope of the present invention which is limited solely by the appended claims.

What is claimed is:

1. An injection mold in which a film gate of a resin is formed during injection molding and in which shearing of the film gate is conducted by movement of a gate cutter alone, the injection mold comprising means forming a mold cavity including a die having a bore with an axis and a diameter, the bore providing a flow channel for molding material to flow into the mold cavity, a cylindrical gate cutter having an axis coinciding with an axis of the bore, and reciprocable along its axis, said gate cutter having a stepped cylindrical form including a main cylindrical portion having a diameter and a coaxial end cylindrical portion of smaller diameter than the diameter of the main cylindrical portion and smaller than the diameter of the bore, said end cylindrical portion, when the mold is closed, being partially received in the bore of the die so as to form therebetween an annular gap of a radial size which determines a gate thickness, an outer peripheral surface of the end portion of said gate cutter which is received in said bore of said die presenting a gate land.

* * * * *